United States Patent
Sato et al.

(10) Patent No.: US 10,464,560 B2
(45) Date of Patent: Nov. 5, 2019

(54) TRAVEL CONTROL METHOD AND TRAVEL CONTROL APPARATUS

(71) Applicant: Nissan Motor Co., Ltd., Yokohama-shi, Kanagawa (JP)

(72) Inventors: Ko Sato, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/316,982

(22) PCT Filed: Jun. 13, 2017

(86) PCT No.: PCT/JP2017/021748
§ 371 (c)(1),
(2) Date: Jan. 10, 2019

(87) PCT Pub. No.: WO2018/012180
PCT Pub. Date: Jan. 18, 2018

(65) Prior Publication Data
US 2019/0241182 A1    Aug. 8, 2019

(30) Foreign Application Priority Data
Jul. 12, 2016   (JP) ................................. 2016-138032

(51) Int. Cl.
*B60W 30/12*      (2006.01)
*B60W 40/04*      (2006.01)
(Continued)

(52) U.S. Cl.
CPC ............. *B60W 30/12* (2013.01); *B60R 21/00* (2013.01); *B60W 30/16* (2013.01); *B60W 40/04* (2013.01);
(Continued)

(58) Field of Classification Search
CPC .............. B60R 21/00; B60R 2300/804; B60T 8/17557; B60W 50/14; B60W 2550/22; G08G 1/16; G08G 1/167
See application file for complete search history.

(56) References Cited

U.S. PATENT DOCUMENTS

| | | | |
|---|---|---|---|
| 2002/0087255 A1* | 7/2002 | Jindo | B60K 31/0008 701/96 |
| 2006/0030987 A1* | 2/2006 | Akita | B62D 15/025 701/41 |

(Continued)

FOREIGN PATENT DOCUMENTS

| | | |
|---|---|---|
| JP | H07019882 A | 1/1995 |
| JP | H10049672 A | 2/1998 |
| JP | 2004206275 A | 7/2004 |
| JP | 2006298059 A | 11/2006 |

*Primary Examiner* — Thomas G Black
*Assistant Examiner* — Ce Li Li
(74) *Attorney, Agent, or Firm* — Young Basile Hanlon & MacFarlane, P.C.

(57) ABSTRACT

A travel control apparatus includes: a recognition processing section that recognizes a lane line of a traffic lane in which a host vehicle is traveling; a vehicle control section that performs lane keeping control such that a lateral position of the host vehicle is at a predetermined position with respect to the lane line; a radar that detects a preceding vehicle traveling ahead of the host vehicle; and a cancelling section that, when the recognition processing section does not detect the lane line, cancels the lane keeping control when a predetermined time has passed after the lane line is no longer detected. The predetermined time is shorter when a following distance between the host vehicle and the preceding vehicle is longer than a predetermined value than when the following distance is shorter than or equal to the predetermined value.

3 Claims, 4 Drawing Sheets

(51) Int. Cl.
  *G06K 9/00* (2006.01)
  *B60R 21/00* (2006.01)
  *B60W 30/16* (2012.01)
  *G08G 1/16* (2006.01)
  *B60W 50/14* (2012.01)
  *B62D 15/02* (2006.01)

(52) U.S. Cl.
  CPC ........... *B60W 50/14* (2013.01); *B62D 15/025* (2013.01); *B62D 15/026* (2013.01); *G06K 9/00798* (2013.01); *G08G 1/16* (2013.01); *G08G 1/167* (2013.01); *B60T 2201/081* (2013.01); *B60W 2520/10* (2013.01); *B60W 2550/22* (2013.01); *B60W 2550/308* (2013.01)

(56) References Cited

U.S. PATENT DOCUMENTS

| | | | | |
|---|---|---|---|---|
| 2010/0324797 | A1* | 12/2010 | Fritz | B60W 10/06 |
| | | | | 701/96 |
| 2012/0212612 | A1* | 8/2012 | Imai | G06K 9/00798 |
| | | | | 348/148 |
| 2012/0226392 | A1* | 9/2012 | Kataoka | G08G 1/167 |
| | | | | 701/1 |
| 2012/0296522 | A1* | 11/2012 | Otuka | G08G 1/167 |
| | | | | 701/41 |
| 2013/0101174 | A1* | 4/2013 | Meis | G08G 1/096716 |
| | | | | 382/104 |
| 2016/0314358 | A1* | 10/2016 | Kushida | G06K 9/00798 |
| 2017/0227971 | A1* | 8/2017 | Shimotani | B60W 30/12 |
| 2017/0232973 | A1* | 8/2017 | Otake | B60W 50/082 |
| | | | | 701/43 |

* cited by examiner

TRAVEL CONTROL METHOD AND TRAVEL CONTROL APPARATUS

CROSS REFERENCE TO RELATED APPLICATION

The present application claims priority to Japanese Patent Application No. 2016-138032, filed Jul. 12, 2016, incorporated herein in its entirety.

TECHNICAL FIELD

The present invention relates to travel control methods and travel control apparatuses for controlling the travel of a vehicle.

BACKGROUND

There is known a technique for recognizing lane lines drawn on the road surface, making a vehicle travel along the traffic lane defined by the lane lines, and when the lane lines are not recognized, making the vehicle travel following a preceding vehicle (see Japanese Patent Application Publication No. 2004-206275).

However, if the vehicle simply follows the preceding vehicle; when the preceding vehicle does not travel along the traffic lane, the vehicle may not travel remaining at a predetermined position in the width direction of the traffic lane. This may decrease the reliability of the control to make the vehicle travel along the traffic lane, what is called lane keeping control.

SUMMARY

In light of the above problem, an object of the present invention is to provide a travel control method and a travel control apparatus that are capable of performing the lane keeping control with high reliability.

A travel control method according to an aspect of the present invention, when a lane line is not detected, cancels lane keeping control when a predetermined time has passed after the lane line is no longer detected. The predetermined time is shorter when the following distance between the host vehicle and the preceding vehicle is longer than a predetermined value than when the following distance is shorter than or equal to the predetermined value.

The present invention improves the reliability of lane keeping control.

DETAILED DESCRIPTION

Figure 1:
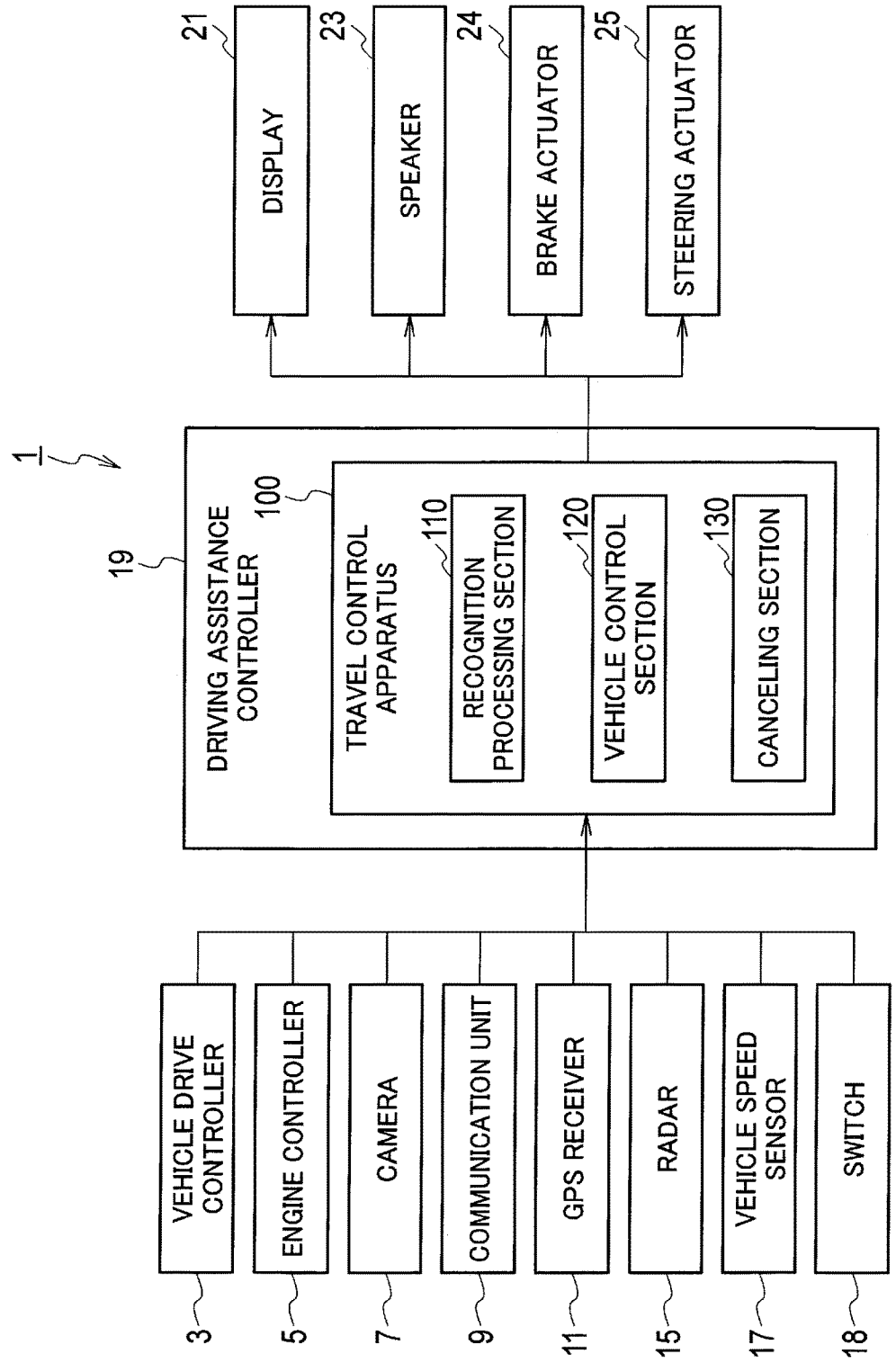
FIG. 1 is a block diagram for explaining a basic configuration of a travel control apparatus according to an embodiment of the present invention.

Hereinafter, an embodiment of the present invention will be described with reference the drawings. In the illustration in the drawings, the same parts are denoted by the same reference signs, and description thereof is omitted.

With reference to FIG. 1, description will be provided for the configuration of a travel control system 1 according to the embodiment of the present invention. As illustrated in FIG. 1, the travel control system 1 includes a vehicle drive controller 3, engine controller 5, camera 7, communication unit 9, GPS receiver 11, radar 15, vehicle speed sensor 17, and switch 18. The travel control system 1 also includes a driving assistance controller 19, display 21, speaker 23, brake actuator 24, and steering actuator 25. The travel control system 1 is mounted on the host vehicle, which is equipped with a system that enables the host vehicle to travel following the preceding vehicle ahead of the host vehicle, such as adaptive cruise control. In this embodiment, the preceding vehicle means a vehicle that is positioned ahead of the host vehicle and also in the traffic lane in which the host vehicle is travelling.

The vehicle drive controller 3 controls driving of the vehicle such as an anti-lock braking system, a traction control system, and vehicle dynamics control. The engine controller 5 controls the engine. The camera 7 is an image sensor that captures images of the area ahead of the host vehicle and acquires images including the preceding vehicle and the lane lines of the traffic lane. The images acquired by the camera 7 are used for acquiring information such as the following distance and the relative speed to the preceding vehicle and the positions of the lane lines. The communication unit 9 is a communication device that performs transmission and reception on information communication services using road-to-vehicle communication or mobile phone lines. The GPS receiver 11 receives information on the latitude, longitude, and altitude of the host vehicle from satellites. The radar 15 measures the following distance and the relative speed between the preceding vehicle and the host vehicle using, for example, a millimeter wave sensor. The vehicle speed sensor 17 measures the vehicle speed of the host vehicle. The switch 18 is a switch for switching between the lane keeping control mode and the manual drive mode, the lane keeping mode being a mode in which the travel of the host vehicle is controlled such that the host vehicle travels at a predetermined position with respect to the lane lines of the traffic lane in which the host vehicle is traveling, the manual drive mode being a mode in which the travel of the host vehicle is not controlled. The switch 18 is operated by the driver of the host vehicle. Note that the lane keeping mode is also switched to the manual drive mode by the driver's intervention in the driving operation. After that, when a predetermined time has passed after the driver's intervention finishes, the travel control apparatus 100 resumes controlling the travel. In other words, the travel control apparatus 100 switches the mode from the manual drive mode to the lane keeping control mode without an operation of the switch 18.

The driving assistance controller 19 controls driving assistance systems such as adaptive cruise control, emergency brakes, and auto-hold brakes. The driving assistance controller 19 may include a system for the adaptive cruise control with a steering control function added. Using the camera 7 and the radar 15, the driving assistance controller 19 detects the presence of the preceding vehicle and the lane lines (lane detection), measures the following distance and the lateral position of the preceding vehicle with respect to the host vehicle or the lane lines, and sends instructions to the engine controller 5, brake actuator 24, steering actuator 25, and the like to control acceleration or deceleration, and steering of the host vehicle. The driving assistance controller 19, when there is no preceding vehicle, performs vehicle speed control that allows the host vehicle to travel keeping a set vehicle speed, and when there is a preceding vehicle, performs following-distance keeping control that allows the host vehicle to travel keeping the following distance to the preceding vehicle constant. When the preceding vehicle stops, the driving assistance controller 19 also stops the host vehicle and performs stop holding control. Note that in this embodiment, description is provided as an example for a driving assistance system that involves the driver's operations, but the present invention can also be applicable to an automated driving system less involving the driver's operations.

The display 21 displays the statuses of the systems, such as the adaptive cruise control, emergency brakes, and auto-hold brakes. The speaker 23 outputs sound when the adaptive cruise control, emergency brakes, auto-hold brakes, and the like present information or give an alert. The brake actuator 24 performs brake operations for braking control of the host vehicle under instructions from the driving assistance controller 19. The steering actuator 25 performs steering operations for controlling the lateral position of the host vehicle under instructions from the driving assistance controller 19.

A travel control apparatus 100 is mounted on the host vehicle as a controller integrated with the driving assistance controller 19. The travel control apparatus 100 recognizes the traffic lane in which the host vehicle is traveling and controls the travel of the host vehicle such that the host vehicle is at a predetermined position with respect to the lane lines of the traffic lane (for example, at the center of the right and left lane lines). Specifically, the travel control apparatus 100 controls at least one of steering and braking of the vehicle such that the lateral position of the host vehicle is at a predetermined position with respect to the lane lines of the traffic lane. Here, the description will continue taking, as an example, the case where the travel control apparatus 100 controls steering of the vehicle by transmitting control signals to the steering actuator 25. In this embodiment, the lane keeping control is defined as recognizing the traffic lane in which the host vehicle is driving, and controlling the travel of the host vehicle such that the host vehicle is at a predetermined position with respect to the lane lines of the traffic lane.

The travel control apparatus 100 is, for example, a general purpose microcomputer including a central processing unit (CPU), memory, and input-output unit. A computer program (travel control program) for causing the microcomputer to function as the travel control apparatus 100 is installed in the microcomputer and executed. This makes the general purpose microcomputer function as the travel control apparatus 100. Note that although here description is provided for an example in which the travel control apparatus 100 is implemented by software, it is a matter of course that the travel control apparatus 100 can be configured by preparing dedicated hardware for executing each information process described below. In addition, the units (110, 120, and 130) included in the travel control apparatus 100 may be implemented by individual pieces of hardware. Further, not only the travel control apparatus 100 but also each of the vehicle drive controller 3, engine controller 5, and driving assistance controller 19 can be implemented by software or dedicated hardware in a similar manner. Moreover, the travel control apparatus 100 may also serve as an electronic control unit (ECU) used for other control related to the vehicle.

The travel control apparatus 100 includes a recognition processing section 110, vehicle control section 120, and canceling section 130.

The recognition processing section 110 recognizes the lane lines that define the traffic lane in which the host vehicle is traveling, from images acquired by the camera 7.

The vehicle control section 120 controls the travel of the host vehicle, for example, steering of the host vehicle such that the lateral position of the host vehicle with respect to the lane lines recognized by the recognition processing section 110 is at a predetermined position. Specifically, the vehicle control section 120 transmits control signals to the steering actuator 25 to control steering torque outputted by the steering actuator 25. This enables the travel control apparatus 100 to control steering of the host vehicle.

The canceling section 130 cancels the lane keeping control when the recognition processing section 110 does not detect the lane lines. Here, the time after the recognition processing section 110 no longer detects the lane lines until the canceling section 130 cancels the lane keeping control differs depending on whether the following distance between the host vehicle and the preceding vehicle is longer than a predetermined value (for example, 7 to 8 m) or shorter than or equal to the predetermined value. Specifically, the time until the canceling section 130 cancels the lane keeping control is longer when the following distance between the host vehicle and the preceding vehicle is shorter than or equal to the predetermined value and it is shorter when the following distance is longer than the predetermined value. This point will be described in detail below. Note that the time after the recognition processing section 110 no longer detects the lane lines until the canceling section 130 cancels the lane keeping control is simply referred to as canceling time. In addition, unless otherwise noted, the following distance is the following distance between the host vehicle and the preceding vehicle.

First, description will be provided for the case where the following distance is longer than a predetermined value.

A scene where the following distance is long is, for example, a scene where the host vehicle is traveling on a highway, and the following distance is sufficiently long. In such a scene, it is unlikely that the preceding vehicle hides the lane lines, and it is highly probable that the lane lines of the traffic lane in which the host vehicle is traveling are included in the angle of view of the camera 7. Even so, when the recognition processing section 110 still does not detect the lane lines, it is conceivable that the camera 7's detection is not working properly. For example, the factors that hampers the camera 7's detection are the driving environment (such as backlight, rain, and fog) and the state of the lanes (such as a blur and dirt). For this reason, when the following distance is longer than a predetermined value, and the recognition processing section 110 does not detect the lane lines for a first predetermined time, the canceling section 130 cancels the lane keeping control. The reason why the canceling section 130 waits for the first predetermined time is that the time taken to detect the lane lines is considered because the intervals of the lane lines (dashed lines) are longer on highways than those of local roads.

Figure 3:
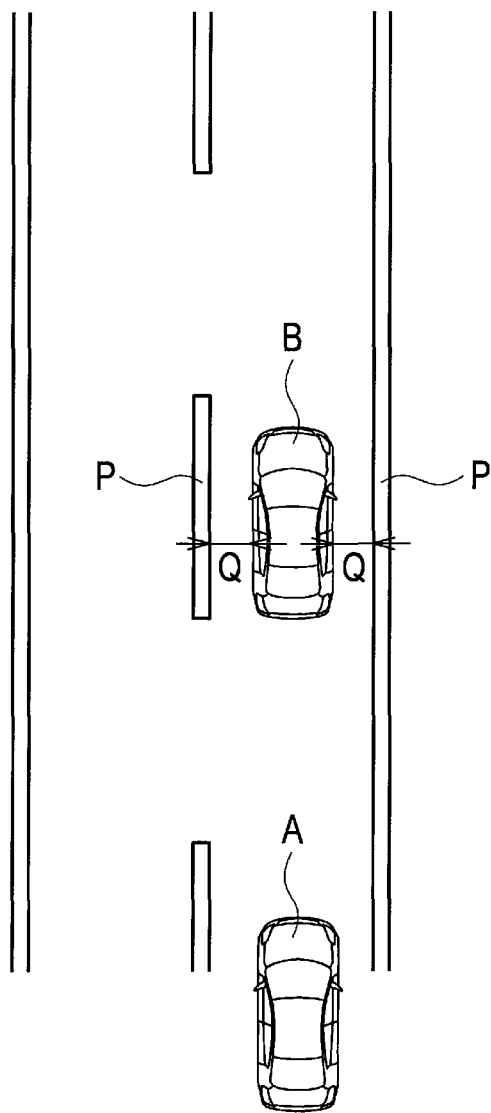
FIG. 3 is a diagram for explaining an example of lane keeping control.
Figure 4:
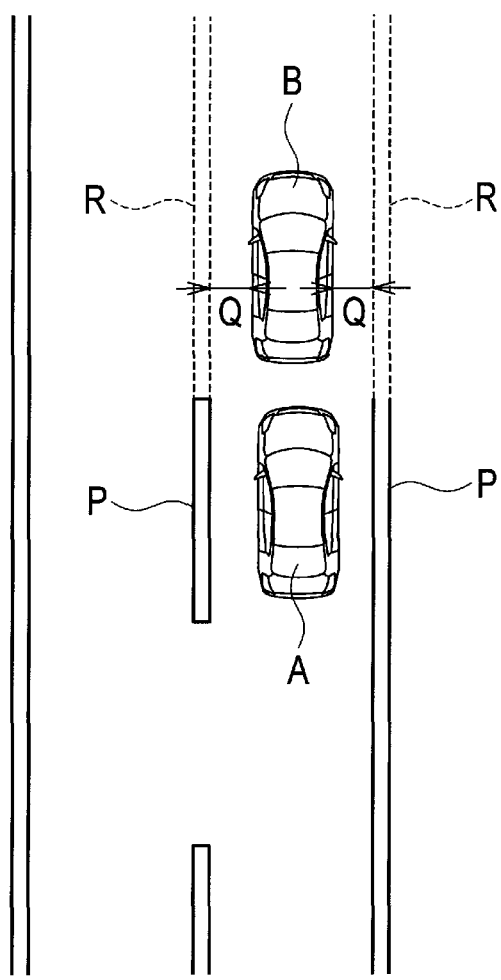
FIG. 4 is a diagram for explaining an example of lane keeping control.

Next, description will be provided for the case where the following distance is shorter than or equal to the predetermined value, in other words, the following distance is short. Examples of scenes where the following distance is short include, for example, a scene where the host vehicle is at a stand-still at an intersection or in traffic congestion and a scene where the host vehicle is traveling at a slow speed. In such scenes, the preceding vehicle hides the lane lines in some cases, and the lane lines of the traffic lane in which the host vehicle is traveling may not be included in the angle of view of the camera 7. In this case, the recognition processing section 110 cannot recognize the lane lines. However, even in such a case, there is a method that allows for continuing the lane keeping control for a while. This method will be described using FIGS. 3 and 4. In the scene illustrated in FIG. 3, a preceding vehicle B is traveling in a predetermined distance range ahead of the host vehicle A in the traffic lane in which the host vehicle A is traveling. In the scene illustrated in FIG. 3, the positional relationship between the preceding vehicle B and lane lines P is stored in the computer in advance using the camera 7 or the like, and based on this positional relationship, imaginary lane lines are estimated by the computer from the current position of the preceding vehicle B. Specifically, as illustrated in FIG. 4, the computer estimates that imaginary lane lines R extending along the traveling direction of the host vehicle A or the preceding vehicle B are at the positions at distances Q from the sides of the preceding vehicle B. Then, the travel of the host vehicle is controlled such that the lateral position of the host vehicle is at a predetermined position with respect to the estimated imaginary lane lines R. Alternatively, assuming that the position of the preceding vehicle is within the traffic lane, the travel of the host vehicle may be controlled such that the lateral position of the host vehicle is at a predetermined position in the center of the preceding vehicle in the vehicle width direction. This allows the host vehicle to continue the lane keeping control even when the recognition processing section 110 does not recognize the lane lines. Meanwhile, there may be a case where while the travel of the host vehicle is being controlled relative to the imaginary lane lines, the angle of view of the camera 7 comes to include the lane lines, and the recognition processing section 110 detects the lane lines again. For these reasons, the canceling time can be longer when the following distance is shorter than or equal to a predetermined value than when the following distance is longer than the predetermined value. Thus, when the following distance is shorter than or equal to a predetermined value, and the recognition processing section 110 does not recognize the lane lines for a second predetermined time, the canceling section 130 cancels the lane keeping control. Here, the second predetermined time is longer than the first predetermined time.

When the canceling section 130 cancels the lane keeping control, the driving assistance controller 19 can let the driver know of the cancelation of the lane keeping control via the display 21 or the speaker 23.

Figure 2:
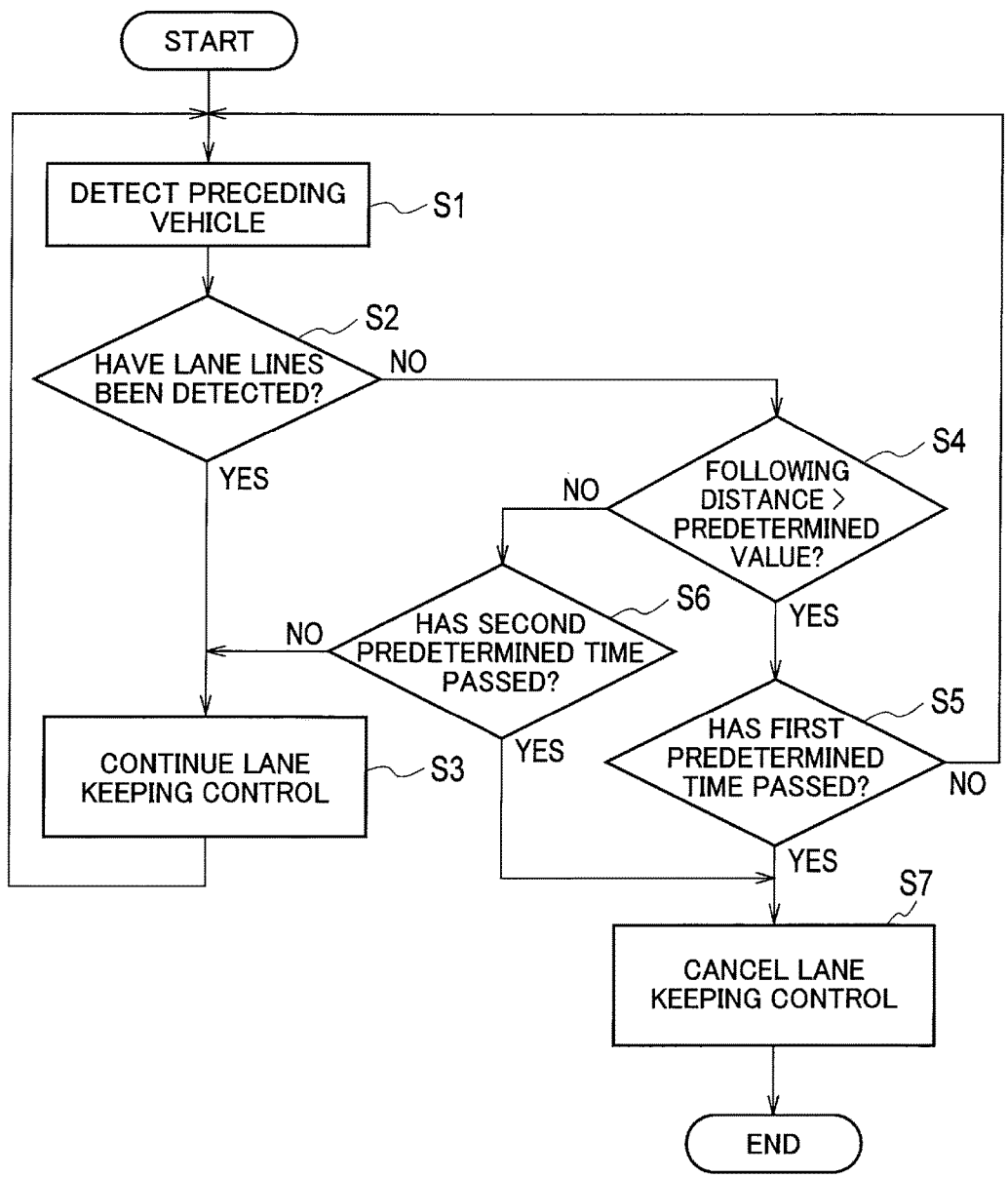
FIG. 2 is a flowchart illustrating an example of a travel control method using the travel control apparatus according to the embodiment of the present invention.

Next, with reference to FIG. 2, description will be provided for an example of a travel control method using the travel control apparatus 100. A series of processes illustrated in the flowchart of FIG. 2 starts when the driver presses the switch 18 to shift the mode to the lane keeping control mode. Note that in this flowchart, it is assumed that there is a preceding vehicle ahead of the host vehicle.

At step S1, the recognition processing section 110 detects the preceding vehicle ahead of the host vehicle, using at least images acquired by the camera 7 or data acquired by the radar 15. The recognition processing section 110 also detects the following distance between the host vehicle and the preceding vehicle.

At step S2, the recognition processing section 110 recognizes the lane lines of the traffic lane in which the host vehicle is traveling from images acquired by the camera 7 that captures images of the area ahead of the host vehicle. If the recognition processing section 110 recognizes the lane lines (YES at step S2), the processing proceeds to step S3.

On the other hand, if the recognition processing section 110 does not recognize the lane lines (NO at step S2), the process proceeds to step S4.

At step S3, the vehicle control section 120 continues the lane keeping control based on the lane lines recognized at step S2.

At step S4, the canceling section 130 judges whether the following distance between the host vehicle and the preceding vehicle is longer than a predetermined value. If the following distance is longer than the predetermined value (YES at step S4), the process proceeds to step S5. On the other hand, if the following distance is shorter than or equal to the predetermined value (NO at step S4), the process proceeds to step S6.

At step S5, the canceling section 130 judges whether the first predetermined time has passed. If the first predetermined time has passed (YES at step S5), the process proceeds to step S7. On the other hand, if the first predetermined time has not passed (NO at step S5), the process returns to step S1.

At step S6, the canceling section 130 judges whether the second predetermined time has passed. If the second predetermined time has passed (YES at step S6), the process proceeds to step S7. On the other hand, if the second predetermined time has not passed (NO at step S6), the process proceeds to step S3.

At step S7, the canceling section 130 cancels the lane keeping control.

As has been described above, the travel control apparatus 100 according to this embodiment provides the following operational advantage.

When the recognition processing section 110 does not recognize the lane lines, the canceling section 130 cancels the lane keeping control after the predetermined time has passed. The time after the recognition processing section 110 no longer detects the lane lines until the canceling section 130 cancels the lane keeping control is shorter when the following distance between the host vehicle and the preceding vehicle is longer than the predetermined value than when it is shorter than or equal to the predetermined value. When it is conceivable that the lane lines are not detected because of some factor in hardware, the canceling section 130 cancels the lane keeping control after the first predetermined time (shorter time) has passed. In addition, when the recognition processing section 110 no longer detects the lane lines, the canceling section 130 does not cancel the lane keeping control until the second predetermined time (longer time) has passed. In this case, the travel control apparatus 100 performs the lane keeping control using information on the preceding vehicle. If the recognition processing section 110 comes to recognize the lane lines before the second predetermined time has passed, the travel control apparatus 100 can continues the lane keeping control without canceling it. This enable the travel control apparatus 100 to improve the reliability in the lane keeping control.

Although the embodiment of the present invention has been described as above, it should not be understood that the description and the drawings constituting part of this disclosure limit the present invention. From this disclosure, various alternatives, examples, and operation techniques will be apparent to those skilled in the art.

For example, the vehicle control section 120 may use the brake actuator 24 instead of the steering actuator 25 to perform control equivalent to steering of the host vehicle. In other words, the brake actuator 24 can turn the host vehicle right or left by applying the right and left brakes asymmetrically while the host vehicle is traveling.

In addition, the lane lines that the recognition processing section 110 recognizes are not limited to lane lines painted on the road surface but only need to be borders of the traffic lane. Specifically, examples of the lane lines that the recognition processing section 110 recognizes include road structures such as road shoulders, curbstones, and guardrails. In the case of recognizing three-dimensional lane lines such as curbstones, the recognition processing section 110 may recognize the lane lines from three-dimensional distance measurement data acquired by the radar 15.

In this embodiment, the description has been provided taking the following distance as a condition to cancel the lane keeping control. Although this following distance is detected by the camera 7 or the radar 15, other methods may be used for estimating the following distance. For example, when the vehicle speed measured by the vehicle speed sensor 17 is higher than a predetermined vehicle speed, the following distance may be estimated to be longer than a predetermined value, and when it is lower than or equal to the predetermined vehicle speed, the following distance may be estimated to be shorter than or equal to the predetermined value. Alternatively, the canceling section 130 may cancel the lane keeping control using the vehicle speed of the host vehicle. In this case, the canceling time is set longer when the vehicle speed of the host vehicle is lower than or equal to a predetermined value and set shorter when the vehicle speed is higher than the predetermined value.

In addition, after the lane keeping control is canceled, other driving assistance systems may be started, such as follow-up control for following the lateral movement of the preceding vehicle traveling ahead of the host vehicle. After the lane keeping control is canceled, it is preferable to continue the driving assistance system, switching to the follow-up control, in particular, only when the vehicle speed of the host vehicle is lower than or equal to a predetermined vehicle speed.

The functions described in the above embodiment can be implemented by one or more processing circuits. Examples of the processing circuits include programed processing apparatuses such as processing apparatuses including electric circuits. Examples of the processing circuits include apparatuses such as an application specific integrated circuit (ASIC) arranged to execute described functions, and circuit parts.

REFERENCE SIGNS LIST

1 travel control system
3 vehicle drive controller
5 engine controller
7 camera
9 communication unit
11 receiver
15 radar
17 vehicle speed sensor
18 switch
19 driving assistance controller
21 display
23 speaker
24 brake actuator
25 steering actuator
100 travel control apparatus
110 recognition processing section (recognition processing circuit)
120 vehicle control section (vehicle control circuit)
130 canceling section (canceling circuit)

The invention claimed is:

1. A travel control method comprising:
recognizing a lane line of a traffic lane in which a host vehicle is traveling;
performing lane keeping control such that a lateral position of the host vehicle is at a predetermined position with respect to the lane line;
detecting a preceding vehicle traveling ahead of the host vehicle in the traffic lane during the lane keeping control; and
when the lane line is not detected, canceling the lane keeping control when a predetermined time has passed after the lane line is no longer detected, wherein
the predetermined time is shorter when a following distance between the host vehicle and the preceding vehicle is longer than a predetermined value than when the following distance is shorter than or equal to the predetermined value.

2. The travel control method according to claim 1, wherein
vehicle speed of the host vehicle is measured,
when the vehicle speed is higher than a predetermined vehicle speed, the following distance is estimated to be longer than the predetermined value, and
when the vehicle speed is lower than or equal to the predetermined vehicle speed, the following distance is estimated to be shorter than or equal to the predetermined value.

3. A travel control apparatus comprising:
a recognition processing circuit that recognizes a lane line of a traffic lane in which a host vehicle is traveling;
a vehicle control circuit that performs lane keeping control such that a lateral position of the host vehicle is at a predetermined position with respect to the lane line;
a sensor that detects a preceding vehicle traveling ahead of the host vehicle in the traffic lane; and
a cancelling circuit that, when the recognition processing circuit does not detect the lane line while the sensor detects the preceding vehicle during the lane keeping control, cancels the lane keeping control when a predetermined time has passed after the lane line is no longer detected, wherein
the predetermined time is shorter when a following distance between the host vehicle and the preceding vehicle is longer than a predetermined value than when the following distance is shorter than or equal to the predetermined value.

* * * * *